United States Patent
Tanaka et al.

(10) Patent No.: US 11,144,162 B1
(45) Date of Patent: Oct. 12, 2021

(54) DEVICE AND METHOD FOR SENSOR ELECTRODE TESTING

(71) Applicant: Synaptics Incorporated, San Jose, CA (US)

(72) Inventors: Nobukazu Tanaka, Tokyo (JP); Takayuki Noto, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/100,768

(22) Filed: Nov. 20, 2020

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/0446* (2019.05); *G06F 3/044* (2013.01)

(58) Field of Classification Search
None
See application file for complete search history.

(56) References Cited

U.S. PATENT DOCUMENTS

| | | | | |
|---|---|---|---|---|
| 7,019,672 | B2* | 3/2006 | Ely | G06F 1/1626 178/20.04 |
| 2010/0097052 | A1* | 4/2010 | Lillestolen | H03M 1/1225 324/207.25 |
| 2013/0207906 | A1* | 8/2013 | Yousefpor | G06F 3/0446 345/173 |
| 2014/0125623 | A1* | 5/2014 | Atkinson | G06F 3/0418 345/174 |
| 2019/0196629 | A1 | 6/2019 | Shepelev et al. | |

* cited by examiner

*Primary Examiner* — Dorothy Harris
(74) *Attorney, Agent, or Firm* — Ferguson Braswell Fraser Kubasta PC

(57) ABSTRACT

A method for testing a sensor electrode is provided. The method includes acquiring a first resulting signal from a sensor electrode. The method further includes determining an in-phase response and a quadrature-phase response through a quadrature demodulation based on the first resulting signal. The method further includes detecting a defect of the sensor electrode based on the in-phase response and the quadrature-phase response.

20 Claims, 14 Drawing Sheets

DEVICE AND METHOD FOR SENSOR ELECTRODE TESTING

FIELD

The disclosed technology generally relates to devices and methods for testing sensor electrodes.

BACKGROUND

Input devices including proximity sensor devices may be used in a variety of electronic systems to provide interfaces for the electronic systems. A proximity sensor device may include a sensing region, demarcated by a surface, in which the proximity sensor device determines the presence, location, force and/or motion of one or more input objects. A proximity sensor device may be based on capacitive proximity sensing using an array of sensor electrodes provided in the sensing region. In various implementations, resulting signals are acquired from the array of sensor electrodes and the capacitive proximity sensing is achieved based on the resulting signals.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In one or more embodiments, a method for testing a sensor electrode is provided. The method includes acquiring a first resulting signal from a sensor electrode. The method further includes determining an in-phase response and a quadrature-phase response through a quadrature demodulation based on the first resulting signal. The method further includes detecting a defect of the sensor electrode based on the in-phase response and the quadrature-phase response.

In one or more embodiments, a processing system is provided. The processing system includes a capacitive sensing circuit and a processor. The capacitive sensing circuit is configured to acquire a first resulting signal from a sensor electrode used for capacitive proximity sensing and apply a quadrature demodulation to the first resulting signal to determine an in-phase response and a quadrature-phase response. The processor is configured to detect a defect of the sensor electrode based on the in-phase response and the quadrature-phase response.

In one or more embodiments, an input device is provided. The input device includes a sensor array and a processing system. The sensor array includes a sensor electrode. The processing system is configured to acquire a first resulting signal from the sensor electrode used for capacitive proximity sensing and apply a quadrature demodulation to the first resulting signal to determine an in-phase response and a quadrature-phase response. The processing system is further configured to detect a defect of the sensor electrode based on the in-phase response and the quadrature-phase response.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
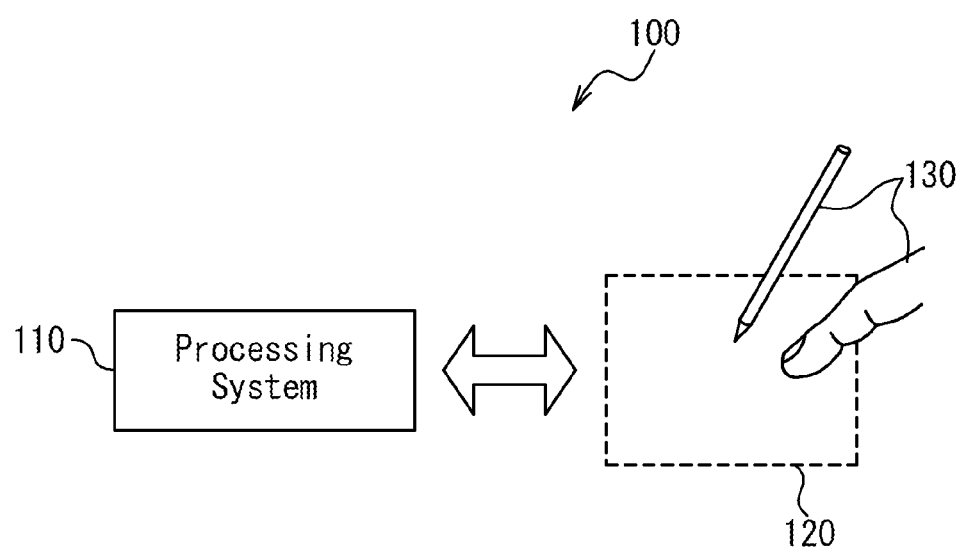
FIG. 1 illustrates an example input device, according to one or more embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

An input device may be configured to sense an input object in a sensing region through capacitive proximity sensing. In various implementations, an array of sensor electrodes is disposed in the sensing region and the input object is sensed based on resulting signals acquired from the array of sensor electrodes, where the resulting signals include information of the capacitances of the sensor electrodes.

To precisely sense the input object, the sensor electrode array is desired to be free from defects. Example defects include open defects, short defects, and other physical defects. To ensure the sensor electrode array suffers from no or reduced defects, each sensor electrode of the sensor electrode array may be tested. In one implementation, the testing of the sensor electrodes may be performed as part of manufacturing the input device. In embodiments where the input device has a built-in test functionality to test the sensor electrodes, the input device may test the sensor electrodes during actual usage. The present disclosure provides various techniques to detect a defect of a sensor electrode.

In one or more embodiments, a method for testing a sensor electrode includes acquiring a first resulting signal from a sensor electrode and determining an in-phase response and a quadrature-phase response through a quadrature demodulation based on the first resulting signal. The method further includes detecting a defect of the sensor electrode based on the in-phase response and the quadrature-phase response. The present disclosure recognizes that a defect of a sensor electrode under test may cause a change in the phase of the resulting signal, resulting in changes in the in-phase response and the quadrature-phase response from expected values. The in-phase response may correspond to an in-phase component of the resulting signal acquired from the sensor electrode under test, and the quadrature-phase response may correspond to a quadrature-phase component of the resulting signal. The use of the in-phase response and the quadrature-phase response may provide a precise detection of a defect of the sensor electrode.

FIG. 1 illustrates an example input device 100, according to one or more embodiments. The input device 100 may be configured to provide input to an electronic system (not shown). The term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include automotive user interfaces configured to give drivers user interface capabilities. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, the electronic system could be a host or a slave to the input device. The electronic system may also be referred to as electronic device. The input device 100 can be implemented as a physical part of the electronic system, or can be physically separate from the electronic system. In one embodiment, the electronic system may be referred to as an external entity. As appropriate, the input device 100 may communicate with parts of the electronic system using any one or more of the following: buses, networks, and other wired or wireless interconnections.

In the illustrated embodiment, the input device 100 is shown as a proximity sensor device configured to sense input provided by one or more input objects 130 in a sensing region 120. Example input objects 130 include fingers and styli, as shown in FIG. 1. An exemplary proximity sensor device may be a touchpad, a touch screen, a touch sensor device and the like.

The sensing region 120 encompasses any space above, around, in and/or near the input device 100 in which the input device 100 is able to detect user input, e.g., user input provided by one or more input objects 130. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiment's sense input that includes: no contact with any surfaces of the input device 100; contact with an input surface, e.g., a touch surface, of the input device 100: contact with an input surface of the input device 100 coupled with some amount of applied force or pressure; and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

In various implementations, the input device 100 is configured to sense one or more input object 130 through capacitive proximity sensing. Some capacitive implementations utilize "absolute capacitance" (also often referred to as "self-capacitance") sensing methods based on changes in the capacitive coupling between sensor electrodes and an input object (e.g., between a system ground and freespace coupling to the user). In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g., system ground, and by detecting the capacitive coupling between the sensor electrodes and input objects. The sensor electrodes may be disposed over a display of a display device. The sensing electrodes may be formed on a common substrate of a display device (e.g., on the encapsulation layer of a rigid or flexible organic light emitting diode (OLED) display). Alternately, the sensor electrodes may be patterned on a single layer of metal mesh over the display active area with cross-overs outside of the active area.

Some capacitive implementations utilize "transcapacitance" (also often referred to as "mutual capacitance") sensing methods based on changes in the capacitive coupling between transmitter electrodes and sensor electrodes. In various embodiments, an input object near the sensor electrodes alters the electric field between the transmitter electrodes and the sensor electrodes, thus changing the measured capacitive coupling. In one implementation, a transcapacitance sensing method operates by detecting the capacitive coupling between one or more transmitter electrodes and one or more sensor electrodes. The coupling may be reduced when an input object coupled to a system ground approaches the sensor electrodes. Transmitter electrodes may be modulated relative to a reference voltage, e.g., system ground. Sensor electrodes may be held substantially constant relative to the reference voltage or modulated relative to the transmitter electrodes to facilitate receipt of resulting signals. A resulting signal may include effect(s) corresponding to one or more transmitter signals, and/or to one or more sources of environmental interference, e.g., other electromagnetic signals. Sensor electrodes may be dedicated transmitters or receivers, or may be configured to both transmit and receive.

In FIG. 1, a processing system 110 is shown as part of the input device 100.

The processing system 110 is configured to operate the hardware of the input device 100 to detect input in the sensing region 120. The processing system 110 may include parts of or all of one or more integrated circuits (ICs) chips and/or other circuitry components.

In some embodiments, the input device 100 includes a proximity sensing interface, and the sensing region 120 overlaps at least part of a display screen. For example, the sensing region 120 may overlap at least a portion of an active area of a display screen (or display panel). The active area of the display panel may correspond to a portion of the display panel where images are updated. In one or more embodiments, the input device 100 may include substantially transparent sensor electrodes (e.g., indium tin oxide (ITO), metal mesh, etc.) overlaying the display screen and provide a user interface for the associated electronic system. The display panel may be any type of dynamic display capable of displaying a visual interface to a user, and may include any type of liquid crystal display (LCD), light emitting diode (LED), organic light emitting diode (OLED), or other display technology. The input device 100 and the display panel may share physical elements. For example, some embodiments may utilize some of the same electrical components for displaying and sensing. As another example, the display panel may be operated in part or in total by the processing system 110.

Figure 2:
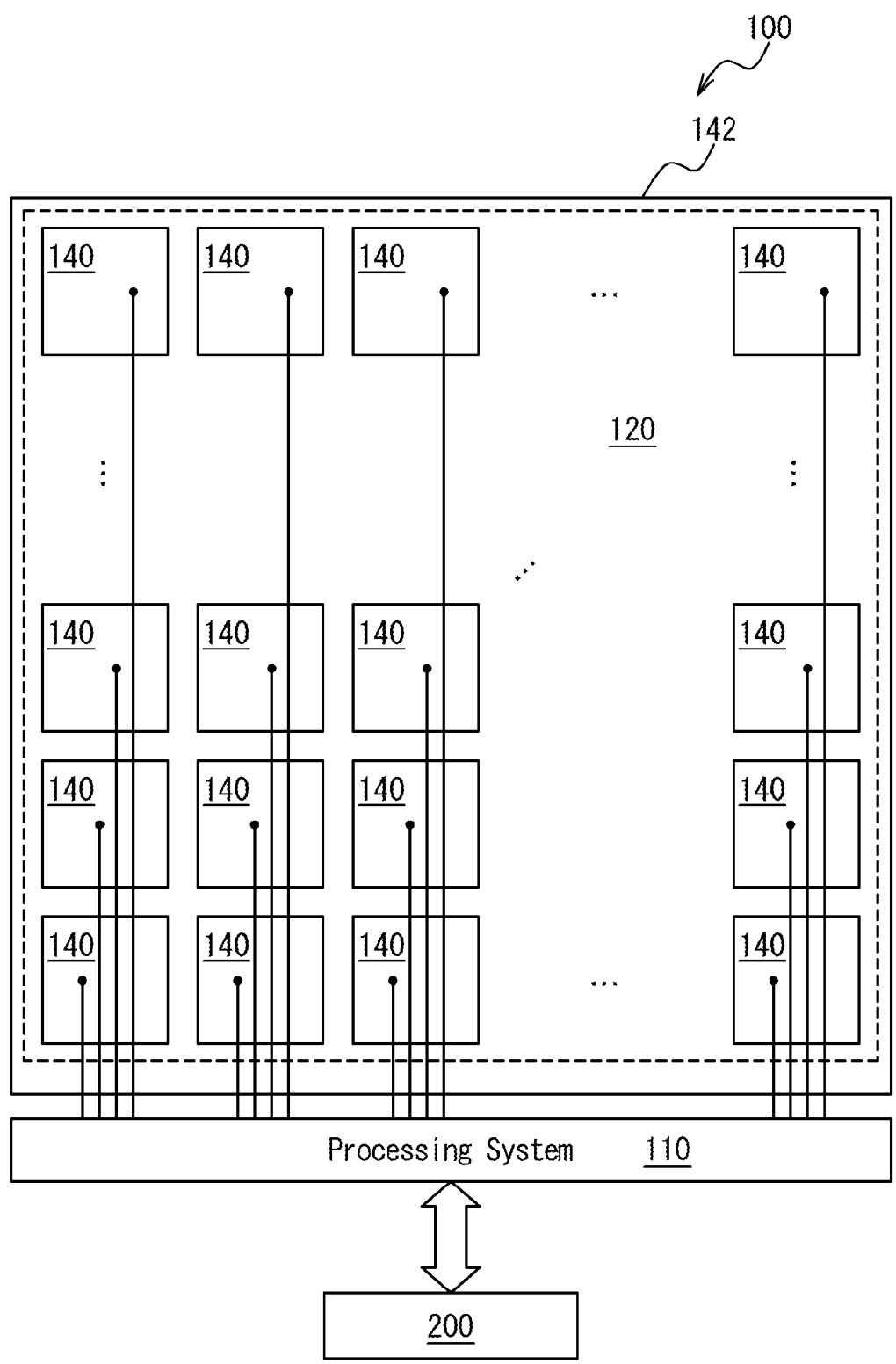
FIG. 2 illustrates an example configuration of an input device adapted to an absolute capacitance sensing method, according to one or more embodiments.

FIG. 2 illustrates an example configuration of the input device 100 adapted to an absolute capacitance sensing method, according to one or more embodiments. In the illustrated embodiment, the input device 100 includes an array of sensor electrodes 140 disposed in the sensing region 120. While FIG. 2 illustrates the sensor electrodes 140 are arranged in a rectangular matrix, the sensor electrodes 140 may be arranged in a different arrangement. The array of sensor electrodes 140 is coupled to the processing system 110. The processing system 110 is configured to provide drive voltages to the sensor electrodes 140 and receive resultant signals from the sensor electrodes 140. In some embodiments, the array of sensor electrodes 140 may be integrated in a proximity sensing interface that overlays an active area of a display panel 142. In some embodiments, the display panel 142 may be a foldable display panel. In other embodiments, the display panel 142 may be curved or tiled. In other embodiments, the sensor electrodes 140 may be integrated in a display panel. In such embodiments, the sensor electrodes 140 may be used as common electrodes (also referred to as counter electrodes) used to update the images.

In one or more embodiments, the input device 100 is coupled to an entity 200 external to the input device 100. The term "coupled" as used herein means connected directly to or connected through one or more intervening components or circuits. Examples of the external entity 200 include a host device, an application processor, a central processing unit (CPU), a special purpose processor, or other types of processors. The input device 100 may be configured to generate positional information of one or more input objects 130 and provide the generated positional information to the external entity 200. "Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Figure 3:
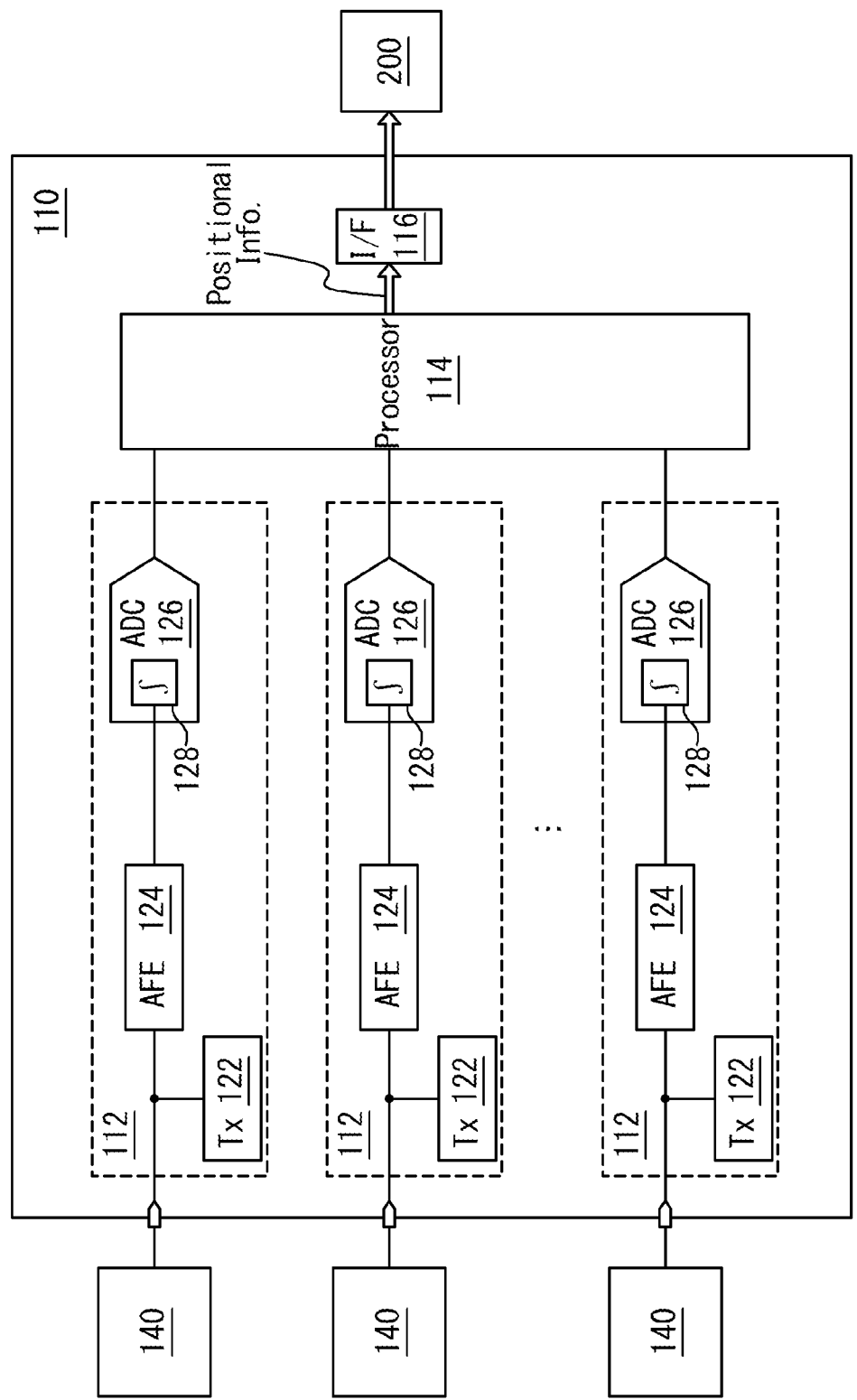
FIG. 3 illustrates an example configuration of a processing system, according to one or more embodiments.

FIG. 3 illustrates an example configuration of the processing system 110, according to one or more embodiments. In the illustrated embodiment, the processing system 110 includes multiple capacitive sensing circuits 112, a processor 114, and interface circuitry 116.

The capacitive sensing circuits 112 are each configured to be connected to one or more corresponding sensor electrode 140. In the illustrated embodiment, the capacitive sensing circuits 112 are each connected to one corresponding sensor electrode 140. In other implementations, the processing system 110 may further include a plurality of multiplexers (not illustrated) each configured to provide connections between a corresponding capacitive sensing circuit 112 and multiple sensor electrodes 140. Each multiplexer may be configured to selectively connect one of corresponding sensor electrodes 140 to the corresponding capacitive sensing circuit 112.

In one or more embodiments, each capacitive sensing circuit 112 includes a transmitter 122, an analog front end (AFE) 124, an analog-to-digital converter (ADC) 126. The transmitter 122 is configured to apply a drive voltage to a corresponding sensor electrode 140. The drive voltage may be a periodical voltage, such as a sinusoidal voltage or a rectangular wave voltage. The AFE 124 is configured to receive a resulting signal from the corresponding sensor electrode 140 while the drive voltage is being applied to the corresponding sensor electrode 140. The AFE 124 is further configured to generate a current output based on the resulting signal. In one implementation, the resulting signal is generated as a current signal, and the AFE 124 is configured to generate the current output such that the current output has a current level corresponding to (e.g., proportional to) the current level of the resulting signal. The AFE 124 may be configured to apply filtering, baseline compensation, and/or other analog processing to the resulting signal. The ADC 126 is configured to apply an analog-to-digital conversion to the current output received from the AFE 124 to generate a digitized output. In various embodiments, the ADC 126 may include an integrator 128 configured to integrate the current output from the AFE 124 to generate an output voltage corresponding to the integration of the current output. In such embodiments, the ADC 126 may be configured to sample the output voltage of the integrator 128 to generate the digitized output.

The capacitive sensing circuits 112 are configured to be apply a quadrature demodulation to the resulting signals received from the sensor electrodes 140 to generate the corresponding digitized outputs. In one implementation, the quadrature demodulation may be achieved by adjusting the integration time window of the integrators 128. The integrators 128 may be configured to integrate the current outputs of the AFEs 124 with a first integration time window to acquire an in-phase (I) response and with a second integration time window to acquire a quadrature-phase (Q) response. The integration window setting for the quadrature demodulation will be discussed later in detail. In other embodiments, the capacitive sensing circuits 112 may further include a pair of mixers configured to demodulate the current output from the AFE 124 using a pair of local carriers, one of which is in-phase with the drive voltage and the other is in a quadrature phase relationship to the drive voltage.

The processor 114 is configured to generate positional information of the input object 130 based on the digitized outputs received from the capacitive sensing circuits 112. Examples of the processor 114 include a micro control unit (MCU), a central processing unit (CPU), a microcomputer, or other types of processors.

The interface circuitry 116 is configured to transfer the positional information from the processor 114 to the external entity 200. The external entity 200 may be configured to recognize user input based on the positional information and respond to the user input. In embodiments where the external entity 200 is configured to render an image displayed on a display panel, the external entity 200 may be configured to update the displayed image based on the positional information (e.g., move a pointer or a cursor based on the positional information.)

The processing system 110 is configured to generate the positional information of the one or more input objects 130 in a capacitive proximity sensing operation. In the capacitive proximity sensing operation, the transmitters 122 apply drive voltages to sensor electrodes 140 connected to the capacitive sensing circuits 112. The AFEs 124 receives resulting signals from the sensor electrodes 140 while the drive voltages are being applied to the sensor electrodes 140. The AFEs 124 generate the current outputs corresponding to the resulting signals. The current levels of the current outputs of the AFEs 124 may correspond to the current levels of the resulting signals. The ADCs 126 apply an analog-to-digital conversion to the current outputs of AFEs 124 to generate digitized outputs. The processor 114 generates positional information of one or more input object 130 based on the digitized outputs of the ADCs 126. The positional information thus generated may be transferred to the external entity 200, and the external entity 200 may recognize user's input based on the positional information.

In one or more embodiments, the sensor electrodes 140 are tested during a test process using the processing system 110. The test process may be performed during a manufacturing process of the input device 100 after the processing system 110 is connected to the array of the sensor electrodes 140 in an assembly process. One issue may be that testing the sensor electrodes 140 is not necessarily easy after the array of the sensor electrodes 140 is coupled to the processing system 110. After the array of the sensor electrodes 140 is coupled to the processing system 110 in the manufacturing process, the array of the sensor electrodes 140 may be unable to be directly connected to a test device due to a limitation in the number of external connection terminals of the array of the sensor electrodes 140. Accordingly, a special approach may be needed to test the array of the sensor electrodes 140 after the array of the sensor electrodes 140 is coupled to the processing system 110. The disclosure recognizes that a defect of a sensor electrode 140 may cause a change in the phase of the resulting signal received from the sensor electrode 140. In one or more embodiments, the processing system 110 is configured to acquire an in-phase response and a quadrature response based on the resulting signal of the sensor electrode 140, where the in-phase response and the quadrature response incorporate information of the phase of the resulting signal from the sensor electrode 140. The defect of the sensor electrode 140 is detected based on the in-phase response and the quadrature response. In the following, various approaches are presented to test the array of the sensor electrodes 140 using the processing system 110.

Figure 4:
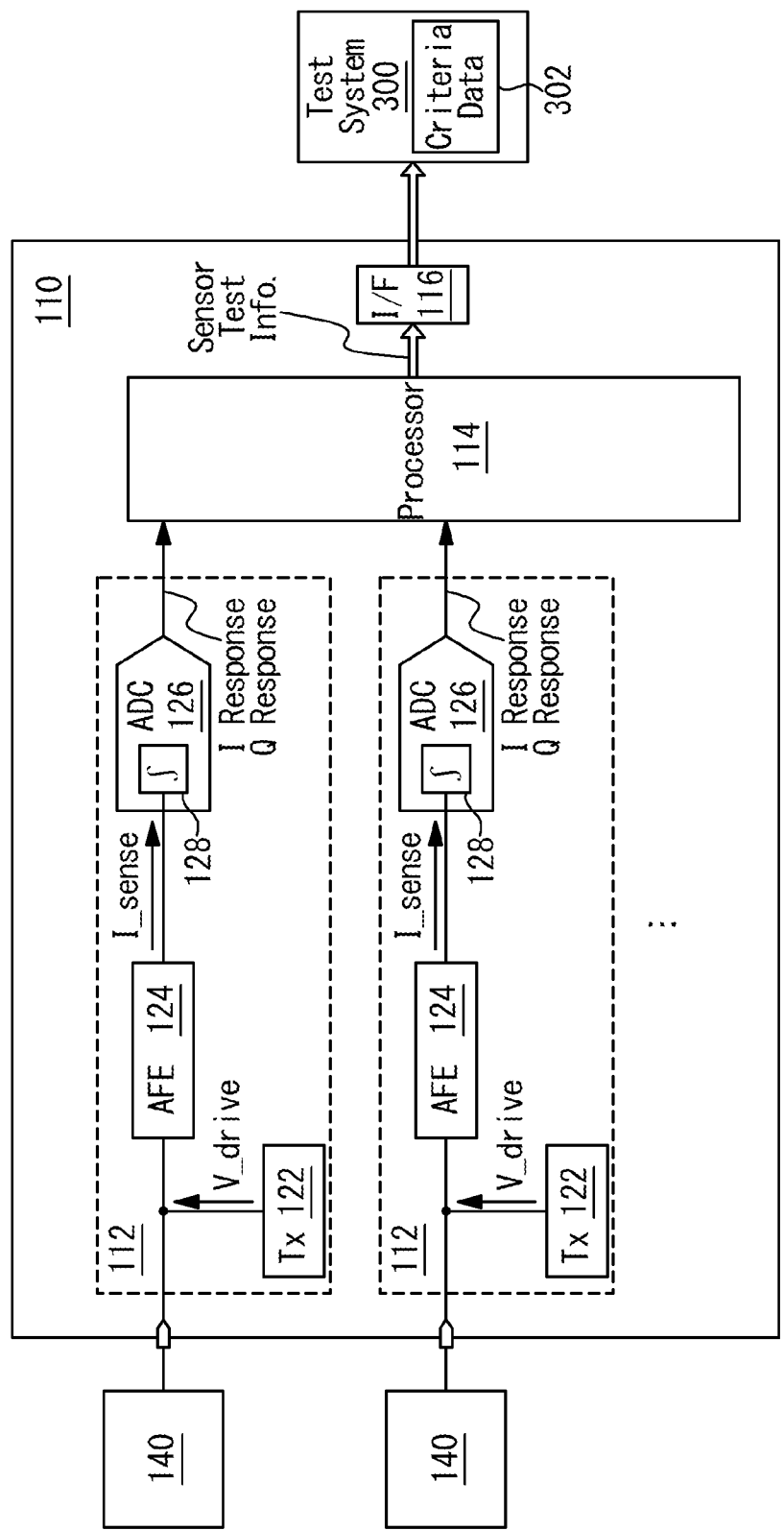
FIG. 4 an example operation of a processing system to test an array of sensor electrodes, according to one or more embodiments.

FIG. 4 illustrates an example operation of the processing system 110 to test the array of the sensor electrodes 140, according to one or more embodiments. In the illustrated embodiment, a test system 300 (e.g., a test device provided in a manufacture line of input devices) is connected to the processing system 110 during the test process of the manufacturing process of the input device 100. The test system 300 may be configured to test various functionalities of the input device 100. In various embodiments, the test system 300 may be configured to instruct the processing system 110 to test the sensor electrodes 140. The capacitive sensing circuits 112 and the processor 114 of the processing system 110 may be configured to start operations for the testing in response to the instruction from the test system 300.

In one or more embodiments, the transmitter 122 of each capacitive sensing circuit 112 applies a periodic drive voltage V_drive to a corresponding sensor electrode 140 during the test process. In one implementation, the periodic drive voltage is a sinusoidal voltage. The use of the sinusoidal voltage may effectively reduce an electromagnetic interference (EMI) generated during the test process. Each AFE 124 receives a resulting signal from the corresponding sensor electrode 140 while the periodical drive voltage is being applied to the corresponding sensor electrode 140. Each AFE 124 generates a current output I_sense corresponding to the current level of the resulting signal.

The AFE 124 and the ADC 126 of each capacitive sensing circuit 112 operate to apply a quadrature demodulation to the corresponding resulting signal. In one implementation, the quadrature modulation may be achieved by adjusting the integration time window setting of the integrator 128. The integrator 128 of the ADC 126 may be configured to integrate the current output of the AFE 124 with a first integration time window to acquire an in-phase (I) response that corresponds to an in-phase component of the resulting signal. In embodiments where the resulting signal is handled as a current signal, the in-phase component of the resulting signal is a component shifted from the drive voltage V_drive by 90 degrees, since a sensor electrode 140 can be approximately regarded as a capacitive load. To acquire a quadrature-phase (Q) response that corresponds to a quadrature-phase component of the resulting signal, the integrator 128 of the ADC 126 may be further configured to integrate the current output of the AFE 124 with a second integration time window, where the first integration time window and the second integration time window are shifted from each other by 90 degrees in phase (or by one fourth of the periodicity of the drive voltage in time.) In embodiments where the resulting signal is handled as a current signal, the quadrature-phase component of the resulting signal is a component having the same phase as the drive voltage V_drive. The ADC 126 may be configured to sample the output of the integrator 128 at the end of the first integration time window to generate the in-phase response and sample the output of the integrator 128 at the end of the second integration time window to generate the quadrature-phase response. In such embodiments, the digitized output of the ADC 126 may include the in-phase response and the quadrature-phase response thus generated.

Figure 5:
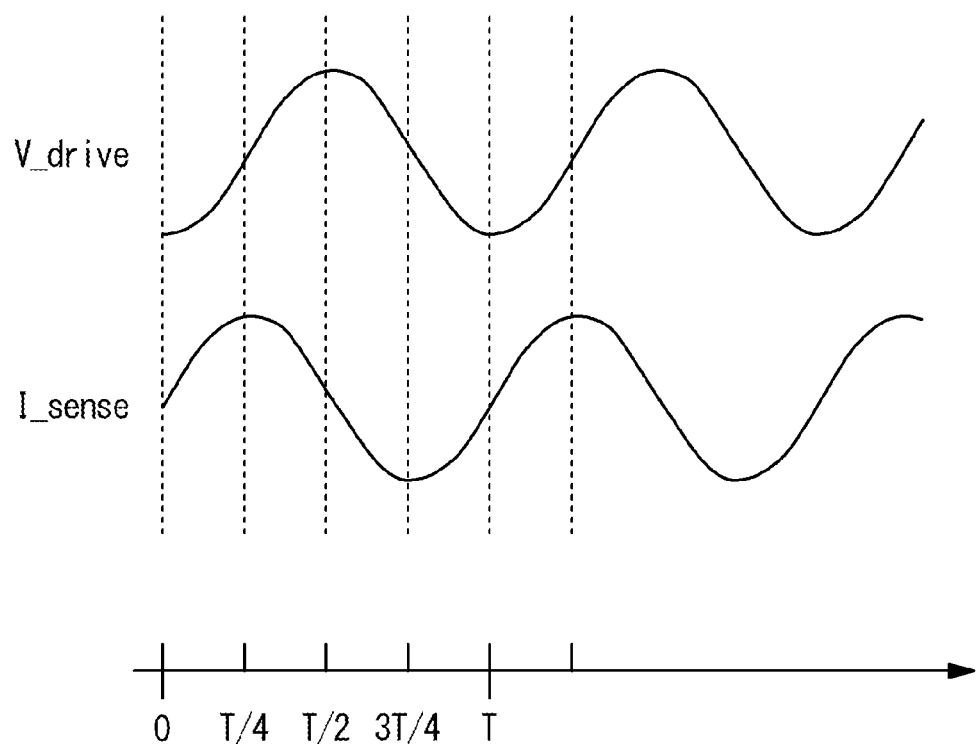
FIG. 5 illustrates example waveforms of a drive voltage and a current output of an analog front end (AFE), according to one or more embodiments.

FIG. 5 illustrates example waveforms of the drive voltage V_drive and the current output I_sense of the AFE 124, according to one or more embodiments, where T is the periodicity of the drive voltage V_sense. In the illustrated embodiment, the drive voltage V_sense is a sinusoidal voltage represented as $V\_sense=A \cos \omega t$, where A is the amplitude of the drive voltage and $\omega$ is the angular velocity defined as $\omega=2\pi/T$. The phase of the drive voltage V_sense is defined as zero. Since each sensor electrode 140 can be approximately regarded as a capacitive load, the phase of the current output I_sense may be approximately advanced by 90 degrees in phase with respect to the drive voltage V_sense.

In one implementation, the integration of the output current I_sense of the AFE 124 during the period from $t=0$ to $t=T/2$ corresponds to the in-phase component of the resulting signal, and the integration of the output current I_sense during the period from $t=T/4$ to $t=3T/4$ corresponds to the quadrature-phase component of the resulting signal. In such embodiments, the first integration time window may be defined as the period from $t=0$ to $t=T/2$ to acquire the in-phase response, and the second integration time window may be defined as the period from $t=T/4$ to $t=3T/4$ to acquire the quadrature-phase response. In one example operation, the in-phase response and the quadrature-phase response are sequentially acquired in separate steps. In some embodiments, the integrator 128 may be first configured with the first integration time window (e.g., the period from $t=0$ to $t=T/2$) to acquire the in-phase response. The integrator 128 may be then configured with the second integration time window (e.g., the period from $T=T/4$ to $t=3T/4$) to acquire the quadrature-phase response. In other embodiments, the in-phase response and the quadrature-phase response may be acquired in the opposite order.

It is noted that the first integration time window and the second integration time window may be differently defined as long as the in-phase response and the quadrature-phase response are properly acquired. For example, the first integration time window may be defined as the period from $t=0$ to $t=T/4$ and the period from $t=T/2$ to $t=3T/4$ to acquire the in-phase response, and the second integration time window may be defined as the period from $t=T/4$ to $t=T/2$ and the period from $t=3T/4$ to $t=T$ to acquire the quadrature-phase response. In such embodiments, a sign-inverted current output of the AFE 124 may be integrated during the period from $t=T/2$ to $t=3T/4$ of the first integration time window, and the sign-inverted current output of the AFE 124 may be integrated during the period from $t=3T/4$ to $t=T$ of the second integration time window.

In other embodiments, each capacitive sensing circuits 112 may further include a pair of mixers configured to demodulate the current output from the AFE 124 using a pair of local carriers, one of which is in-phase with the drive voltage and the other is in a quadrature phase relationship to the drive voltage. In such embodiments, the output of one of the pair of mixers corresponds to the in-phase response, and the output of the other corresponds to the quadrature-phase response. The ADC 126 may be configured to apply an analog-to-digital conversion to the outputs of the mixers to generate the in-phase response and the quadrature-phase response.

Referring back to FIG. 4, the processor 114 is configured to receive the digitized outputs of the respective ADCs 126 and generate sensor test information based on the digitized outputs of the ADCs 126. In one implementation, the digitized outputs of the respective ADCs 126 each include a first value corresponding to the in-phase response and a second value corresponding to the quadrature-phase response. The sensor test information may include information of the in-phase response and the quadrature-phase response (e.g., the first value and the second value) for each sensor electrode 140. The sensor test information is forwarded to the test system 300 via the interface circuitry 116.

The test system 300 is configured to detect a defect of each sensor electrode 140 based on the sensor test information. In one implementation, the test system 300 is configured to store criteria data 302 that define criteria to determine whether each sensor electrode 140 has a defect based on the sensor test information. The test system 300 may be configured to generate test result data indicative of whether the array of the sensor electrodes 140 has a defect. In other embodiments, the test result data may be additionally or alternatively indicative of whether each of the sensor electrodes 140 has a defect.

Figure 6A:
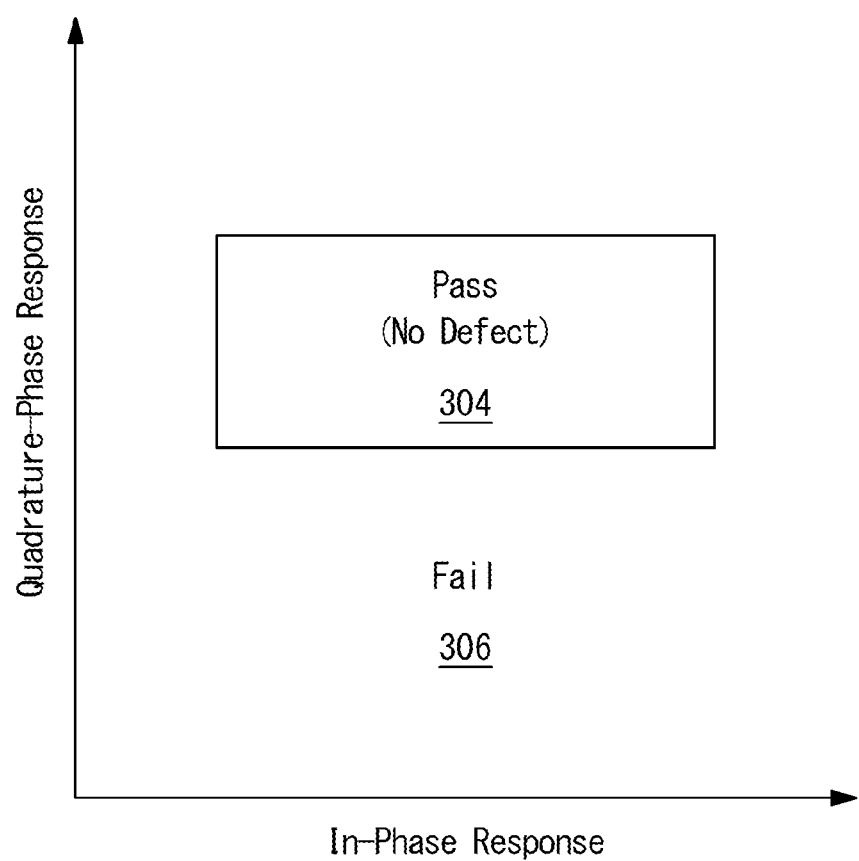
FIG. 6A and FIG. 6B illustrate example pass regions and fail regions, according to one or more embodiments.

Referring to FIG. 6A, the test system 300 may be configured to map the in-phase response and the quadrature-phase response corresponding to the sensor electrode 140 of interest to a coordinate plane, the coordinate plane comprising a first axis corresponding to the in-phase response and a second axis corresponding to the quadrature-phase response. In the illustrated embodiment, the horizontal axis corresponds to the in-phase response and the vertical axis corresponds to the quadrature-phase response. In such embodiments, the test system 300 may be configured to determine whether the point corresponding to the in-phase response and the quadrature-phase response is located in a predetermined region defined in the coordinate plane. In one implementation, as illustrated in FIG. 6A, the criteria data 302 may define a "pass" region 304, and the region external to the pass region 304 may be defined as a "fail" region 306. The test system 300 may be configured to determine whether the point corresponding to the in-phase response and the quadrature-phase response is located in the pass region 304. The test system 300 may be further configured to determine, in response to the point corresponding to the in-phase response and the quadrature-phase response being located in the pass region 304, that the sensor electrode 140 of interest suffers from no defect and the sensor electrode 140 of interest passes the test. The test system 300 may be further configured to detect a defect of the sensor electrode 140 of interest in response to the point corresponding to the in-phase response and the quadrature-phase response being located in the fail region 306 (i.e., located out of the pass region 304). It is noted that, while the diagram of FIG. 6A is illustrative, the test system 300 may be configured to detect the defect of the sensor electrode 140 of interest without creating or displaying the diagram. In the test system 300, the pass region 304 and the fail region 306 may be defined as data structures defining boundaries and the test may be based on whether the point corresponding to the in-phase response and the quadrature-phase response is within the boundary defined by the data structure for the pass region 304.

Figure 6B:
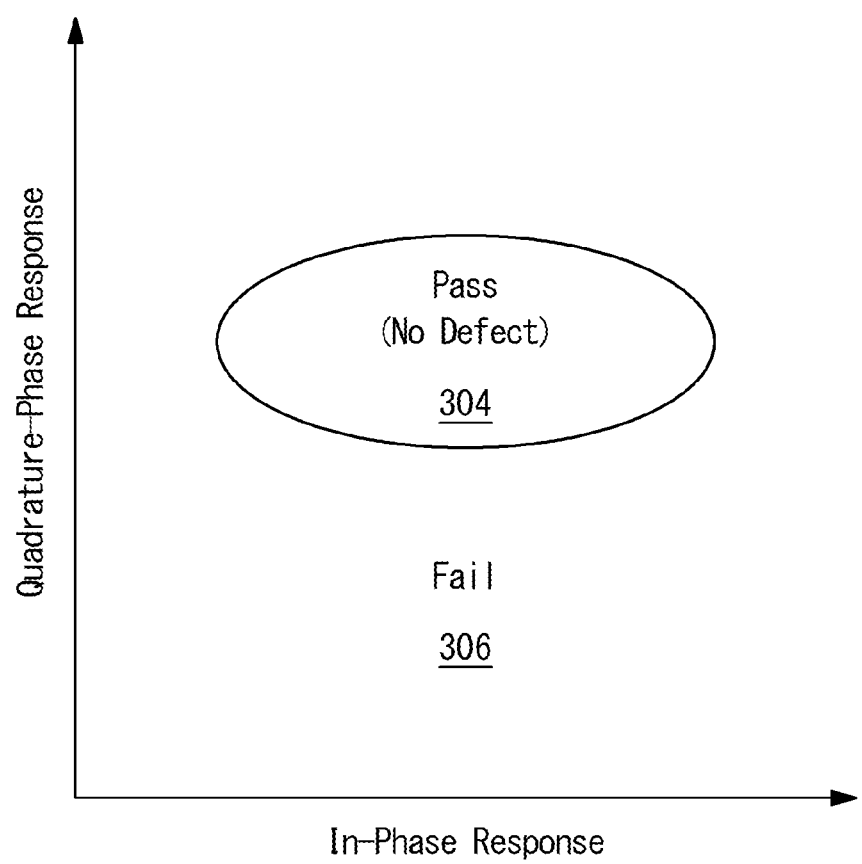

While FIG. 6A illustrates the pass region 304 as being rectangular, the shape of the pass region 304 may be variously modified. For example, the pass region 304 may be defined as an oval region as illustrated in FIG. 6B. The pass region 304 with an oval shape may offer precise detection of defects of sensor electrodes 140 in view of the distribution in each of the in-phase response and the quadrature-phase response among the sensor electrodes 140.

Figure 7:
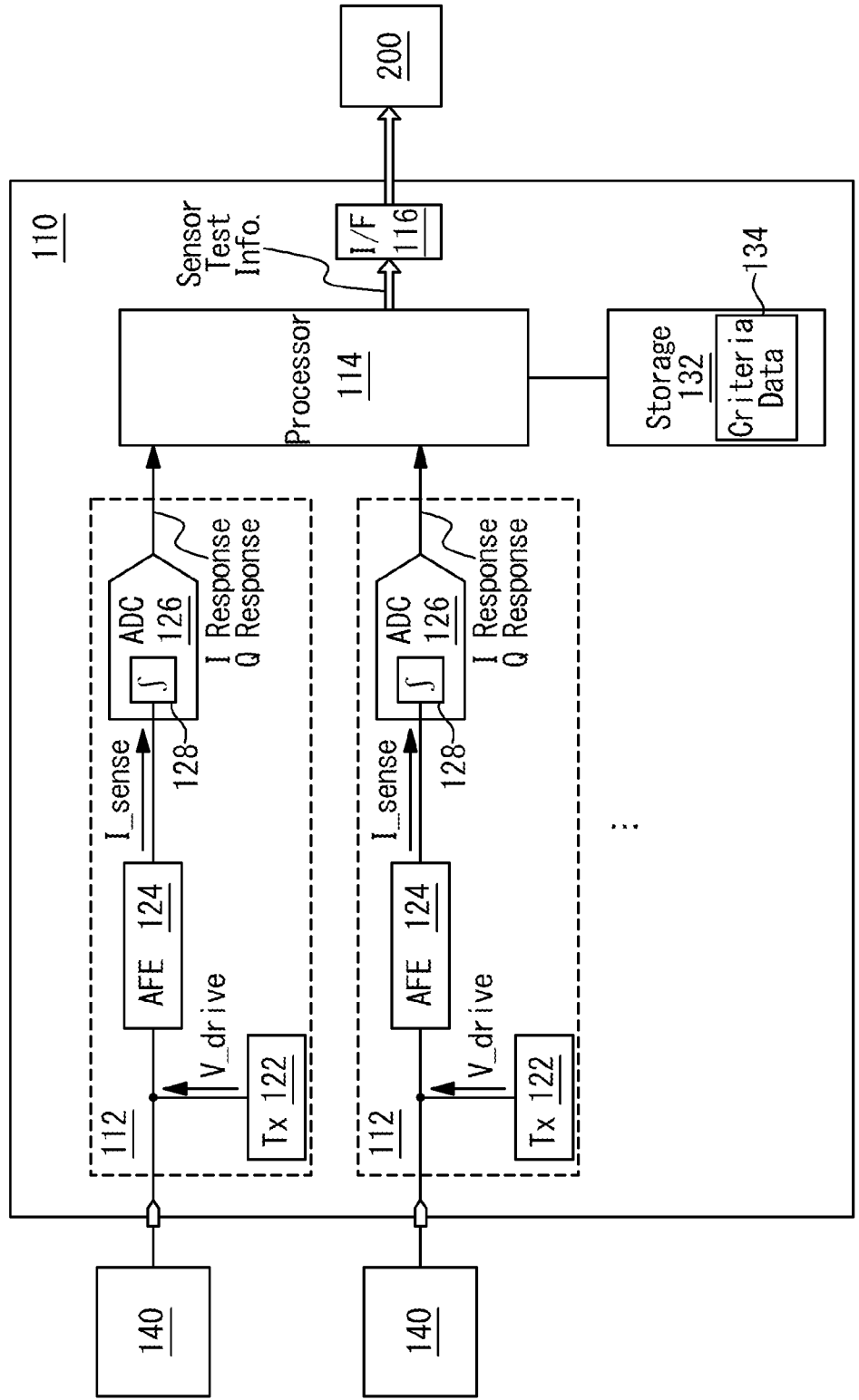
FIG. 7 illustrates an example configuration of a processing system adapted to a built-in test, according to one or more embodiments.

In one or more embodiments, the processing system 110 may be adapted to a built-in test of the array of the sensor electrodes 140. FIG. 7 illustrates an example configuration of the processing system 110 adapted to the built-in test, according to one or more embodiments. In the illustrated embodiment, the processing system 110 includes storage circuitry 132 configured to store criteria data 134 that define criteria to determine whether each sensor electrode 140 has a defect based on the sensor test information. The criteria data 134 may define the pass region 304 similarly to the criteria data 302 as described in relation to FIG. 4, FIG. 6A, and FIG. 6B.

In one or more embodiments, the processor 114 is configured to detect a defect of the sensor electrodes 140 based on the digitized outputs of the respective ADCs 126. In one implementation, the digitized outputs of the respective ADCs 126 may each include a first value corresponding to the in-phase response and a second value corresponding to the quadrature-phase response, and the processor 114 may be configured to map the in-phase response and the quadrature-phase response corresponding to the sensor electrode 140 of interest to a coordinate plane, the coordinate plane including a first axis corresponding to the in-phase response and a second axis corresponding to the quadrature-phase response (also refer to FIG. 6A and FIG. 6B). In such embodiments, the processor 114 may be configured to determine whether the point corresponding to the in-phase response and the quadrature-phase response is located in the pass region 304 defined in the coordinate plane, where the pass region 304 is defined by the criteria data 134. The processor 114 may be further configured to determine, in response to the point corresponding to the in-phase response and the quadrature-phase response being located in the pass region 304, that the sensor electrode 140 of interest suffers from no defect and the sensor electrode 140 of interest pass the test. The processor 114 may be further configured to detect a defect of the sensor electrode 140 of interest in response to the point corresponding to the in-phase response and the quadrature-phase response being located in the fail region 306 (i.e., located out of the pass region 304).

The processor 114 may be further configured to generate sensor test information indicative of the test result of the array of the sensor electrodes 140. In one implementation, the processor 114 may be configured to generate the sensor test information to indicate whether a defect exists in the array of the sensor electrodes 140. In other embodiments, the processor 114 may be configured to generate the sensor test information to indicate whether each sensor electrode 140 that suffers from a defect.

The external entity 200, which is external to the input device 100, may be configured to generate an alert based on the sensor test information. Examples of the external entity 200 include a host device, an application processor, a CPU, and a different type of processor. In one implementation, the external entity 200 may be configured to operate an output device (e.g., a speaker, a display device, and other types of output devices) to output the alert in response to a detection of a defect of the array of the sensor electrodes 140.

The processing system 110 configured as illustrated in FIG. 7 provides built-in test functionality, which enables detection of an in-use defect of the sensor electrodes 140 that occurs in actual usage. For example, the processing system 110 may be configured to automatically test the array of the sensor electrodes 140 with predetermined regular time intervals. In other embodiments, the processing system 110 may be configured to test the array of the sensor electrodes 140 in response to an instruction received from the external entity 200. The processing system 110 may be further configured to generate sensor test information indicative of the test result of the array of the sensor electrodes 140, and the external entity 200 may be configured to output an alert based on the sensor test information. Outputting the alert allows the user to know the occurrence of the defect in actual use.

The built-in test functionality, which provides detection of an in-use defect, is especially useful in automotive applications which require high device reliability. The built-in test functionality is also useful in foldable display panel applications, in which an array of sensor electrodes is integrated in a foldable display panel or a proximity sensing panel with an array of sensor electrodes is overlaid on a foldable display panel. Folding the flexible display panel an increased number of times may cause an in-use defect of an array of sensor electrodes. The built-in test functionality will help detect an in-used defect potentially caused by the repetitive folding of the flexible display panel.

Figure 8:
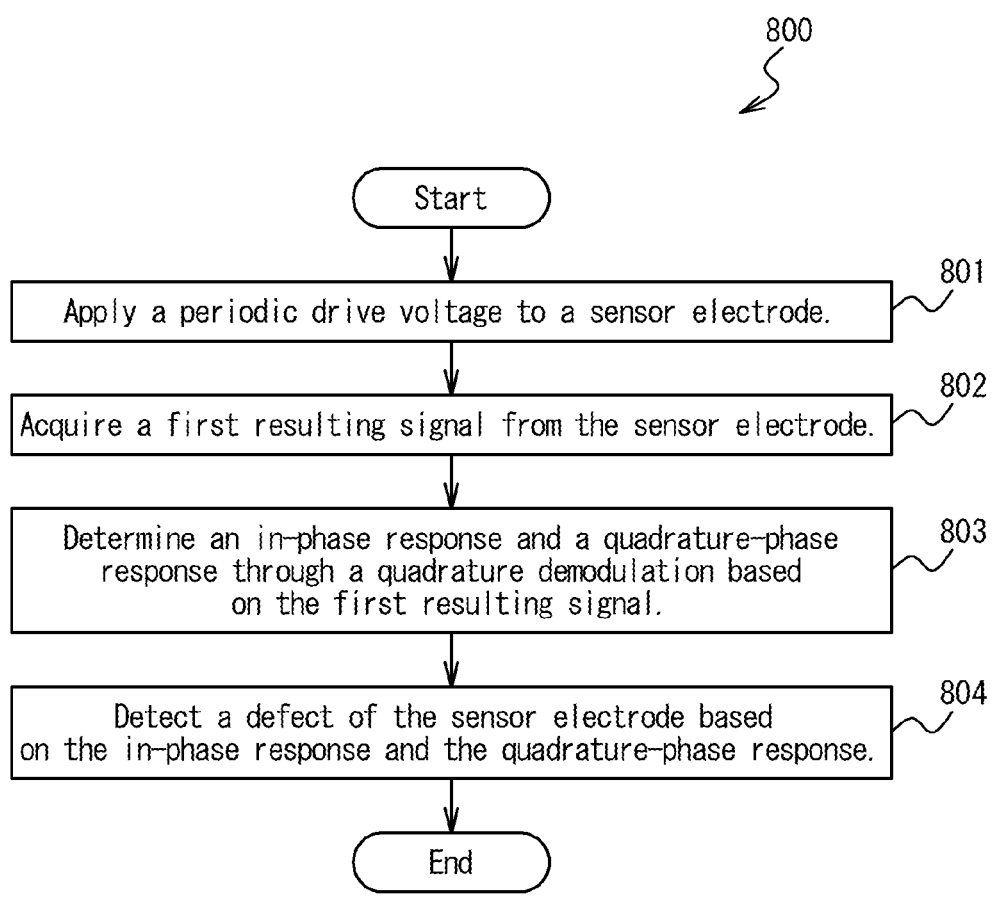
FIG. 8 illustrates example steps for detecting a defect of a sensor electrode adapted to an absolute capacitance sensing method, according to one or more embodiments.

Method 800 of FIG. 8 illustrates steps for detecting a defect of a sensor electrode adapted to an absolute capacitance sensing method (e.g., sensor electrodes 140 illustrated in FIG. 2), according to one or more embodiments. It should be noted that the order of the steps may be altered from the order illustrated. At step 801, a transmitter (e.g., a transmitter 122 illustrated in FIG. 3) applies a periodic drive voltage to a sensor electrode. At step 802, a capacitive sensing circuit (e.g., a capacitive sensing circuit 112) acquires a first resulting signal from the sensor electrode while the periodic drive voltage being applied to the sensor electrode. At step 803, the capacitive sensing circuit determines an in-phase response and a quadrature-phase response through a quadrature demodulation based on the first resulting signal. At step 804, a test system (e.g., the test system 300 illustrated in FIG. 4) detects a defect of the sensor electrode based on the in-phase response and the quadrature-phase response. In other embodiments, the defect detection may be performed by a processor (e.g., the processor 114) in place of the test system.

Figure 9:
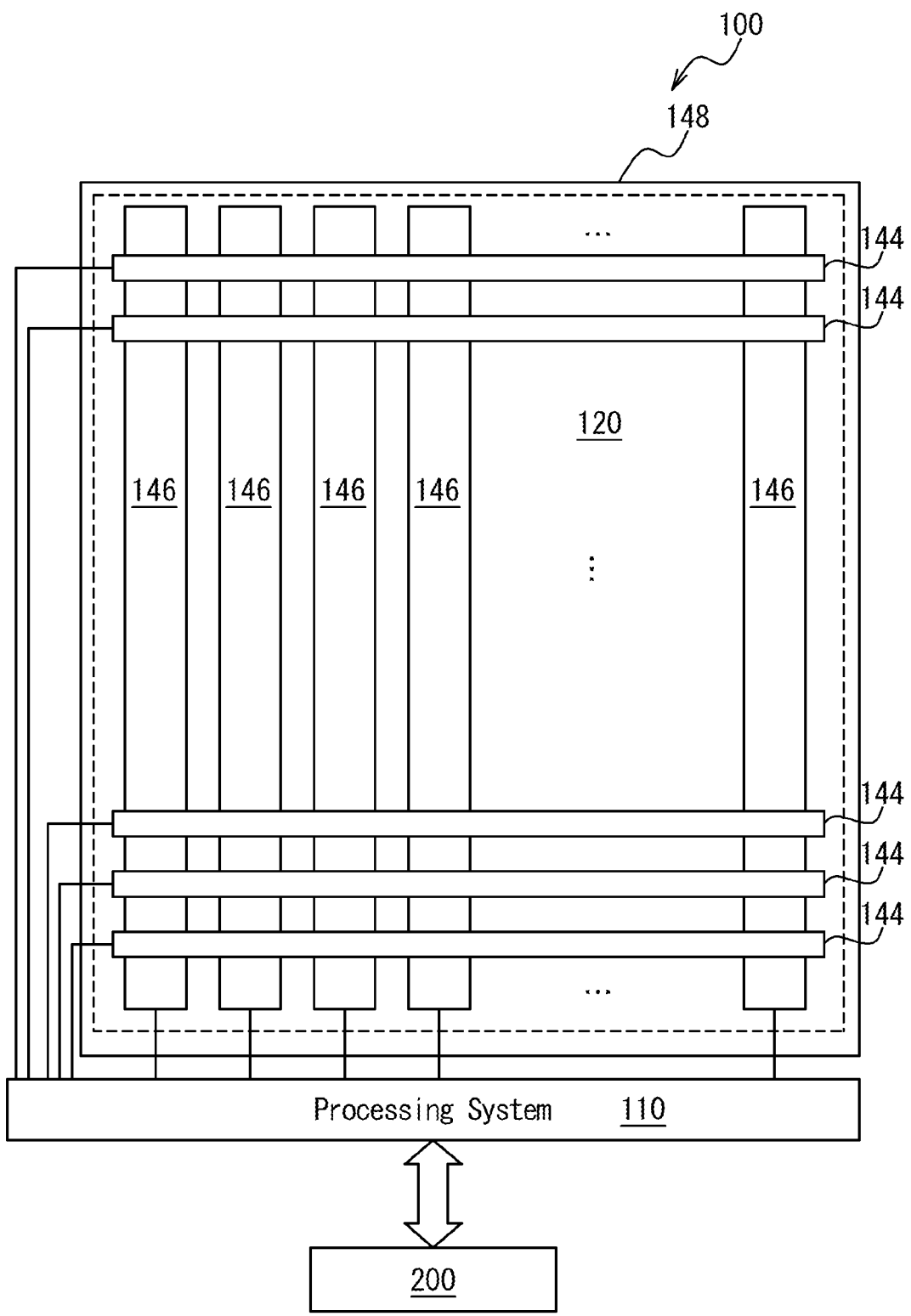
FIG. 9 illustrates an example configuration of an input device adapted to a transcapacitance sensing method, according to one or more embodiments.

FIG. 9 illustrates an example configuration of the input device 100 adapted to a transcapacitance sensing method, according to one or more embodiments. In the illustrated embodiment, the input device 100 includes a set of transmitter electrodes 144 and a set of sensor electrodes 146 disposed in the sensing region 120. The transmitter electrodes 144 and the sensor electrodes 146 are disposed to intersect each other such that the sensor electrodes 146 are capacitively coupled to the transmitter electrodes 144. The transmitter electrodes 144 and the sensor electrodes 146 are both connected to the processing system 110. The processing system 110 is configured to provide transmitter voltages to the transmitter electrodes 144 and receive resultant signals from the sensor electrodes 146. In some embodiments, the transmitter electrodes 144 and the sensor electrodes 146 may be integrated in a proximity sensing interface 148 that overlays an active area of a display panel.

Figure 10:
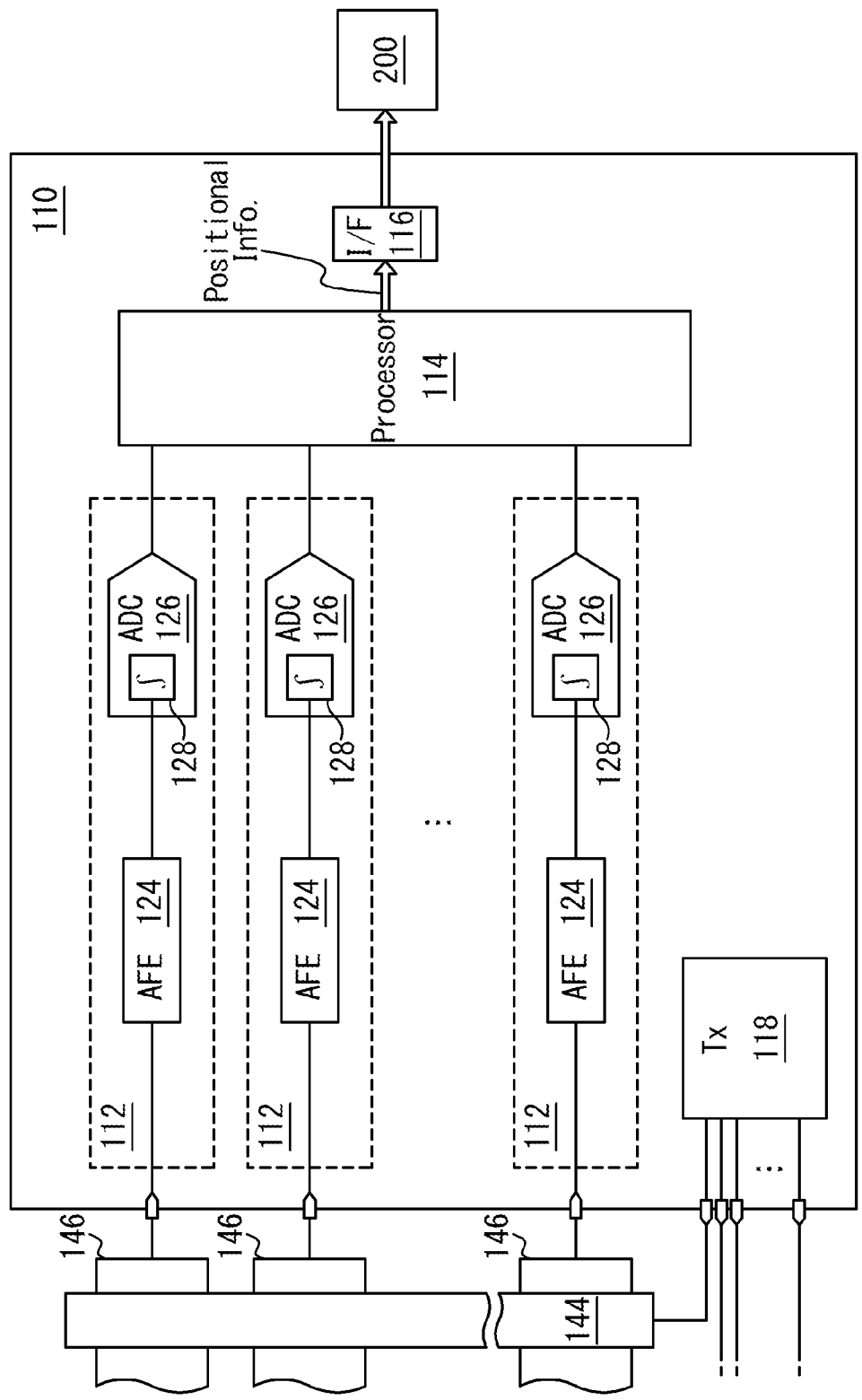
FIG. 10 illustrates an example configuration of a processing system adapted to a transcapacitance sensing method, according to one or more embodiments.

FIG. 10 illustrates an example configuration of the processing system 110 adapted to a transcapacitance sensing method, according to one or more embodiments. The processing system 110 illustrated in FIG. 10 is configured similarly to that illustrated in FIG. 3, except for that the processing system 110 additionally includes transmitter circuitry 118 configured to supply transmitter voltages to the transmitter electrodes 144 while the transmitters 122 are removed from the capacitive sensing circuits 112.

The capacitive sensing circuits 112 are each configured to be connected to one or more corresponding sensor electrodes 146. In the illustrated embodiment, the capacitive sensing circuits 112 are each illustrated as being connected to one corresponding sensor electrode 146. In other implementations, the processing system 110 may further include a plurality of multiplexers (not illustrated) each providing connections to multiple sensor electrodes 146 for a corresponding capacitive sensing circuit 112. Each multiplexer may be configured to selectively connect one of corresponding sensor electrodes 140 to the corresponding capacitive sensing circuit 112.

In the embodiment illustrated in FIG. 10, the capacitive sensing circuits 112 are configured to be apply a quadrature demodulation to the resulting signals received from the sensor electrodes 140 to generate the corresponding digitized outputs. In one implementation, the quadrature demodulation may be achieved by adjusting the integration time window of the integrators 128 as discussed above.

The processor 114 is configured to generate positional information of the input object 130 based on the digitized outputs received from the capacitive sensing circuits 112. The interface circuitry 116 is configured to transfer the positional information from the processor 114 and transfer the same to the external entity 200.

In some embodiments, the processing system 110 of FIG. 10 may be adapted to an absolute capacitance sensing method as well as a transcapacitance sensing method. In such embodiments, the capacitive sensing circuits 112 may further include transmitters, respectively, similarly to the configuration illustrated in FIG. 3. Proximity sensing through the absolute capacitance sensing method may be achieved based on the resulting signals received from the sensor electrodes 146 while the drive signals are being supplied to the sensor electrodes 146 from the transmitters.

Figure 11:
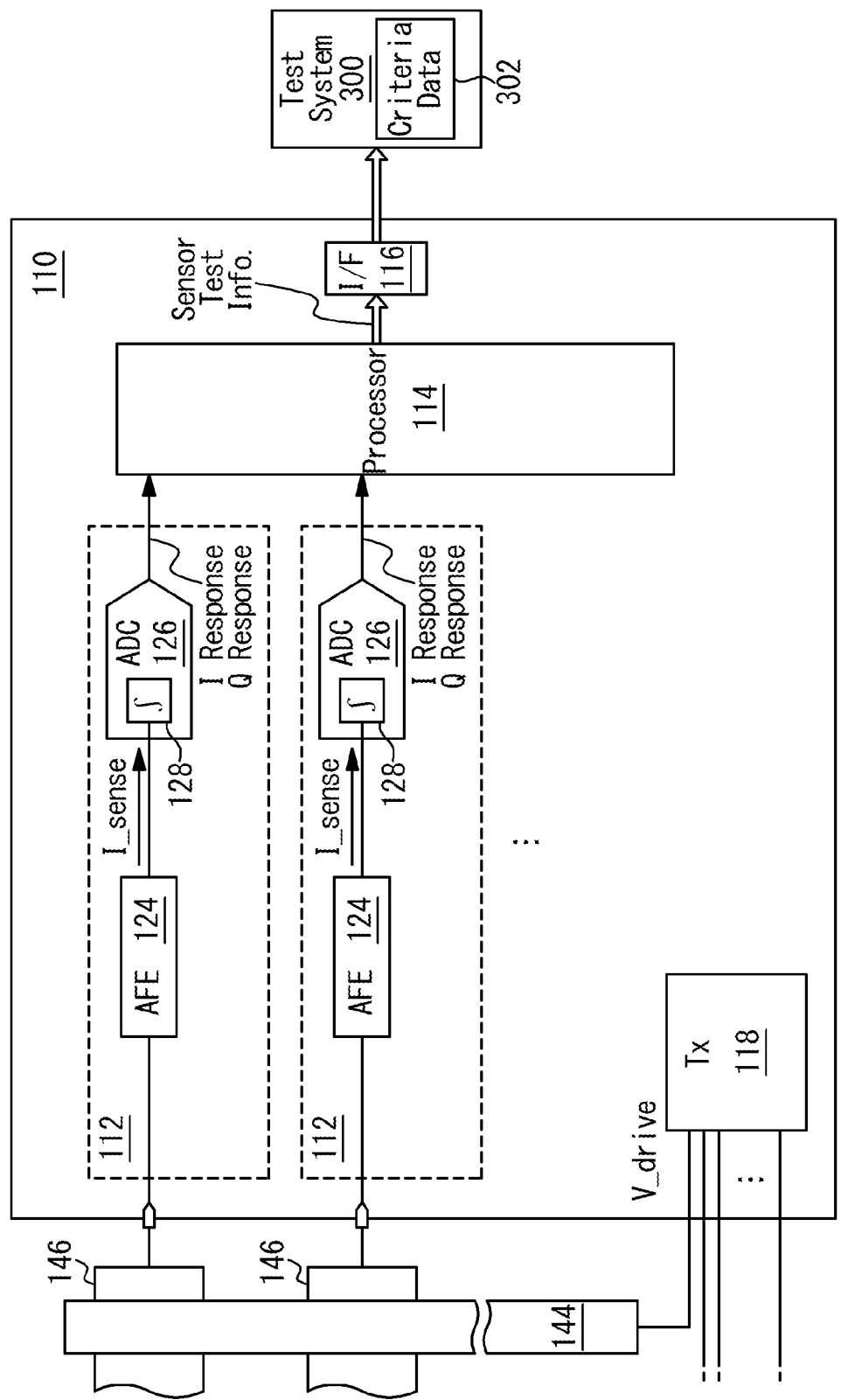
FIG. 11 illustrates an example operation of a processing system to test an array of sensor electrodes, according to one or more embodiments.

FIG. 11 illustrates an example operation of the processing system 110 to test the array of the sensor electrodes 146, according to one or more embodiments. In the illustrated embodiment, the sensor electrodes 146 are tested in a similar manner to the sensor electrodes 140 described in relation to FIG. 4, except for that each capacitive sensing circuit 112 receives the resulting signal from the corresponding sensor electrode 146 while the transmitter circuitry 118 is supplying the periodic drive voltage V_drive to the transmitter electrodes 144.

In one or more embodiments, the transmitter circuitry 118 applies a periodic drive voltage V_drive to the transmitter electrodes 144 during the test process. In one implementation, the periodic drive voltage is a sinusoidal voltage. Each AFE 124 receives a resulting signal from the corresponding sensor electrode 146 while the transmitter circuitry 118 is applying the periodic drive voltage V_drive to the transmitter electrodes 144. Each AFE 124 generates a current output I_sense corresponding to the current level of the resulting signal.

The AFE 124 and the ADC 126 of each capacitive sensing circuit 112 operate to apply a quadrature demodulation to the corresponding resulting signal. In one implementation, the quadrature modulation may be achieved by adjusting the integration time window setting of the integrator 128 as discussed above in relation to FIG. 4 and FIG. 5. The integrator 128 of the ADC 126 may be configured to integrate the current output of the AFE 124 with a first integration time window to acquire an in-phase (I) response that corresponds to an in-phase component of the resulting signal. To acquire an quadrature-phase (Q) response that corresponds to a quadrature-phase component of the resulting signal, the integrator 128 of the ADC 126 may be further configured to integrate the current output of the AFE 124 with a second integration time window, where the first integration time window and the second integration time window are shifted from each other by 90 degrees in phase. The ADC 126 may be configured to sample the output of the integrator 128 at the end of the first integration time window to generate the in-phase response and sample the output of the integrator 128 at the end of the second integration time window to generate the quadrature-phase response. In such embodiments, the digitized output of the ADC 126 may include the in-phase response and the quadrature-phase response thus generated.

The processor 114 is configured to receive the digitized outputs of the respective ADCs 126 and generate sensor test information based on the digitized outputs of the ADCs 126. The sensor test information may include information of the in-phase response and the quadrature-phase response (e.g., a first value corresponding to the in-phase response and a second value corresponding to the quadrature-phase response) for each sensor electrode 146. The sensor test information is forwarded to the test system 300 via the interface circuitry 116.

The test system 300 is configured to detect a defect of the sensor electrodes 146 based on the sensor test information in a similar manner to the sensor electrodes 140 as described above in relation to FIG. 4, FIG. 6A, and FIG. 6B. The test system 300 may be configured to map the in-phase response and the quadrature-phase response corresponding to the sensor electrode 146 of interest to a coordinate plane, the coordinate plane including a first axis corresponding to the in-phase response and a second axis corresponding to the quadrature-phase response. In one implementation, the criteria data 302 stored in the test system 300 may define a pass region 304, and the region external to the pass region 304 may be defined as a fail region 306 as illustrated in FIG. 6A and FIG. 6B. The test system 300 may be further configured to determine, in response to the point corresponding to the in-phase response and the quadrature-phase response being located in the pass region 304, that the sensor electrode 146 of interest suffers from no defect. The test system 300 may be further configured to detect a defect of the sensor electrode 146 of interest in response to the point corresponding to the in-phase response and the quadrature-phase response being located in the fail region 306 (i.e., located out of the pass region 304). As discussed in relation to FIG. 7, the processor 114 may be configured to detect a defect of the sensor electrodes 146 based on the in-phase response and the quadrature-phase response in place of the test system 300 to provide built-in test functionality. In embodiments where each capacitive sensing circuit 112 of the processing system 110 further include a transmitter to achieve an absolute capacitance sensing method, the defect of the sensor electrode 146 of interest may be additionally detected in a similar manner to the defect detection of the sensor electrode 140 described in relation to FIG. 4.

Figure 12:
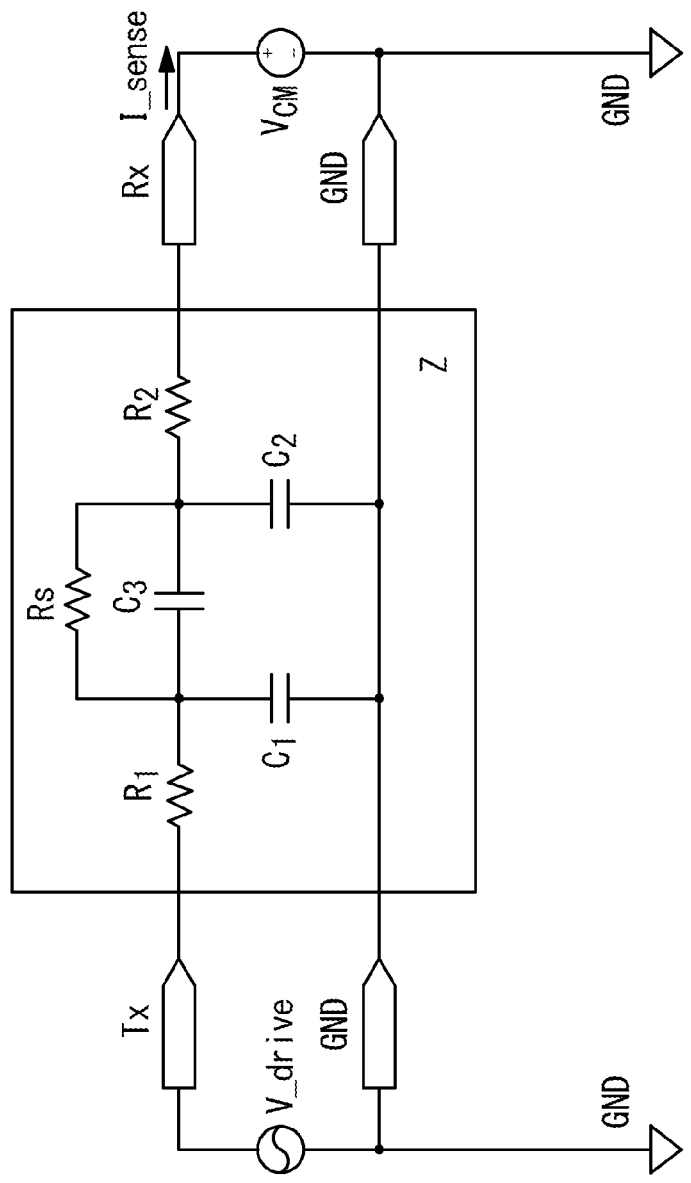
FIG. 12 is an example equivalent circuit diagram of a transmitter electrode and a sensor electrode, according to one or more embodiments.

FIG. 12 is an example equivalent circuit diagram of a transmitter electrode 144 and a sensor electrode 146, according to one or more embodiments. In FIG. 12, $C_1$ represents the capacitance between the transmitter electrode 144 and the ground; $C_2$ represents the capacitance between the sensor electrode 146 and the ground; $C_3$ represents the transcapacitance between the transmitter electrode 144 and the sensor electrode 146; $R_1$ represents the resistance of the transmitter electrode 144; $R_2$ represents the resistance of the sensor electrode 146; and $R_s$ represents the resistance between the transmitter electrode 144 and the sensor electrode 146.

According to the equivalent circuit illustrated in FIG. 12, the complex admittance Y of the sensor electrode 146 viewed from the transmitter electrode 144 is represented as follows:

$$Y = \frac{\left(\frac{1}{R_S} + j\omega C_3\right)}{\left(\left(\frac{1}{R_S} + j\omega C_3\right)(R_1(1 + j\omega R_2 C_2) + R_2(1 + j\omega R_1 C_1)) + (1 + j\omega R_1 C_1)(1 + j\omega R_2 C_2)\right)},$$

where ω is the angular velocity of the periodic drive voltage V_drive. A defect of the sensor electrode 146 may cause a change in the phase of the resultant signal and impact on the complex admittance Y. In one implementation, the in-phase response corresponds to the real part of the complex admittance Y and the quadrature-phase response corresponds to the imaginary part of the complex admittance Y. Accordingly, the use of the in-phase response phase and the quadrature-phase response may enable a detection of a defect of the sensor electrode 146 through evaluation of the change in the phase of the resultant signal.

Figure 13:
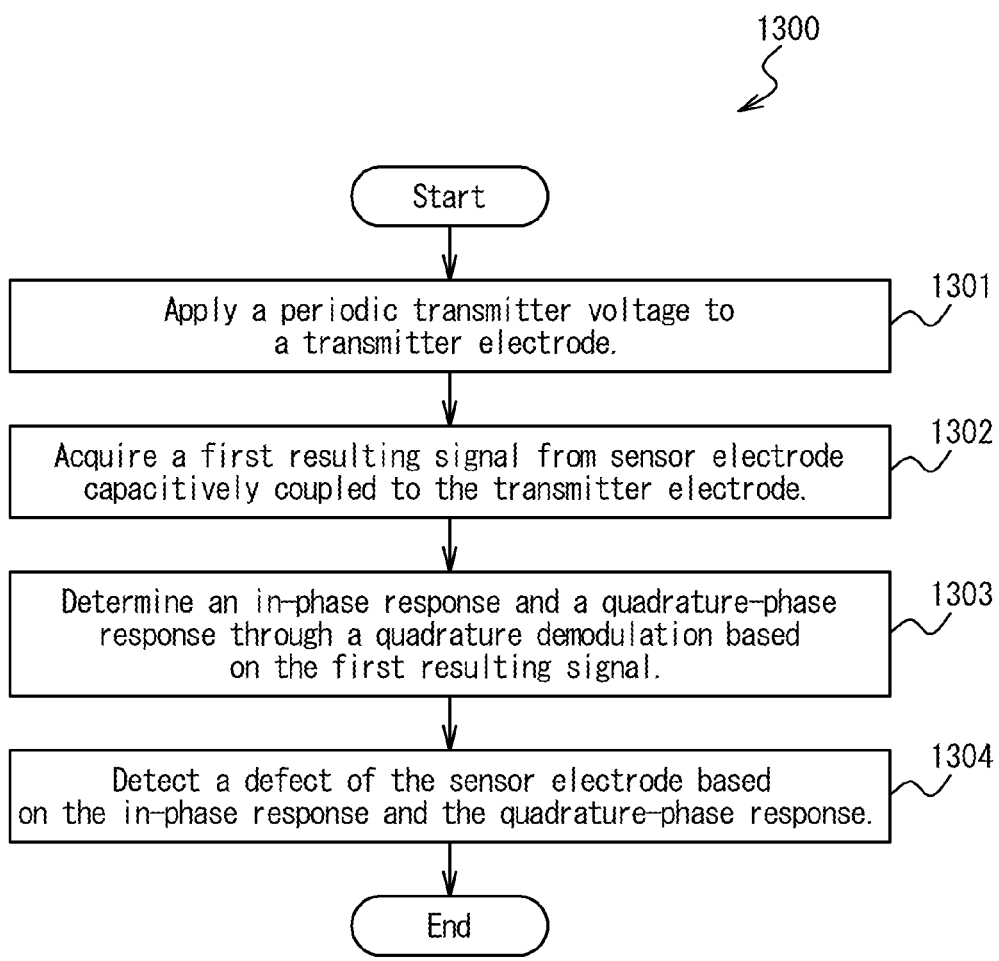
FIG. 13 illustrates steps for detecting a defect of a sensor electrode adapted to a transcapacitance sensing method, according to one or more embodiments.

Method 1300 of FIG. 13 illustrates steps for detecting a defect of a sensor electrode adapted to a transcapacitance sensing method (e.g., sensor electrodes 146 illustrated in FIG. 9), according to one or more embodiments. It should be noted that the order of the steps may be altered from the order illustrated.

At step 1301, transmitter circuitry (e.g., transmitter circuitry 118 illustrated in FIG. 10) applies a periodic drive voltage to a transmitter electrode (e.g., a transmitter electrode 144). At step 1302, a capacitive sensing circuit (e.g., a capacitive sensing circuit 112) acquires a first resulting signal from the sensor electrode. At step 1303, the capacitive sensing circuit determines an in-phase response and a quadrature-phase response through a quadrature demodulation based on the first resulting signal. At step 1304, a test system (e.g., the test system 300 illustrated in FIG. 11) detects a defect of the sensor electrode based on the in-phase response and the quadrature-phase response. In other embodiments, the defect detection may be performed by a processor (e.g., the processor 114) in place of the test system.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A method, comprising:
   acquiring a first resulting signal from a sensor electrode;
   determining an in-phase response and a quadrature-phase response through a quadrature demodulation based on the first resulting signal; and
   detecting a defect of the sensor electrode based on the in-phase response and the quadrature-phase response.

2. The method of claim 1, wherein detecting the defect of the sensor electrode comprises mapping the in-phase response and the quadrature-phase response to a coordinate plane, the coordinate plane comprising a first axis corresponding to the in-phase response and a second axis corresponding to the quadrature-phase response.

3. The method of claim 2, wherein detecting the defect of the sensor electrode is based on whether a point corresponding to the in-phase response and the quadrature-phase response is located in a predetermined region defined in the coordinate plane.

4. The method of claim 1, further comprising:
   acquiring a second resulting signal from the sensor electrode; and
   sensing an input object through capacitive proximity sensing based on the second resulting signal.

5. The method of claim 1, further comprising:
   applying a periodic drive voltage to the sensor electrode while the first resulting signal is being acquired from the sensor electrode,
   wherein the first resulting signal is acquired as a current signal.

6. The method of claim 5, wherein the periodic drive voltage comprises a sinusoidal voltage.

7. The method of claim 1, further comprising:
   applying a periodic transmitter voltage to a transmitter electrode capacitively coupled to the sensor electrode while the first resulting signal is being acquired from the sensor electrode,
   wherein the first resulting signal is acquired as a current signal.

8. The method of claim 1, wherein determining the in-phase response and the quadrature-phase response comprises determining the in-phase response and the quadrature-phase response by using an analog front end (AFE) and an analog-to-digital converter (ADC).

9. The method of claim 8, wherein determining the in-phase response and the quadrature-phase response by using the AFE and the ADC comprises:
   generating, by the AFE, a first current output based on the first resulting signal;
   applying, by the ADC, an analog-to-digital conversion to the first current output to generate a first digitized output comprising:
      a first value corresponding to the in-phase response; and
      a second value corresponding to the quadrature-phase response.

10. The method of claim 9, further comprising:
    generating, by the AFE, a second current output based on a second resulting signal acquired from the sensor electrode in a capacitive proximity sensing operation, and
    applying, by the ADC, an analog-to-digital conversion to the second current output to generate a second digitized output,
    wherein positional information of an input object is generated in the capacitive proximity sensing operation using the second digitized output.

11. A processing system, comprising:
    capacitive sensing circuitry configured to:
       acquire a first resulting signal from a sensor electrode;
       apply a quadrature demodulation to the first resulting signal to determine an in-phase response and a quadrature-phase response; and
    a processor configured to detect a defect of the sensor electrode based on the in-phase response and the quadrature-phase response.

12. The processing system of claim 11, wherein detecting the defect of the sensor electrode comprises mapping the in-phase response and the quadrature-phase response on a coordinate plane defined with a first axis corresponding to the in-phase response and a second axis corresponding to the quadrature-phase response.

13. The processing system of claim 11, wherein the capacitive sensing circuitry comprises:
an AFE configured to generate a first current output based on the first resulting signal;
an ADC configured to apply a first analog-to-digital conversion to the first current output to generate a first digitized output comprising:
a first value corresponding to the in-phase response; and
a second value corresponding to the quadrature-phase response.

14. The processing system of claim 13, wherein the capacitive sensing circuitry is further configured to acquire a second resulting signal from the sensor electrode in a capacitive proximity sensing operation,
wherein the AFE is further configured to generate a second current output based on the second resulting signal in the capacitive proximity sensing operation,
wherein the ADC is configured to apply a second analog-to-digital conversion to the second current output to generate a second digitized output in the capacitive proximity sensing operation, and
wherein the processor is further configured to generate positional information of an input object based on the second digitized output in the capacitive proximity sensing operation.

15. The processing system of claim 11, wherein the capacitive sensing circuitry is further configured to apply a periodic drive voltage to the sensor electrode while the first resulting signal is being acquired from the sensor electrode,
wherein the first resulting signal is acquired as a current signal.

16. The processing system of claim 11, wherein the capacitive sensing circuitry is further configured to apply a periodic transmitter voltage to a transmitter electrode capacitively coupled to the sensor electrode while the first resulting signal is being acquired from the sensor electrode, wherein the first resulting signal is acquired as a current signal.

17. An input device, comprising:
a sensor array comprising a sensor electrode; and
a processing system configured to:
acquire a first resulting signal from the sensor electrode used for capacitive proximity sensing;
apply a quadrature demodulation to the first resulting signal to determine an in-phase response and a quadrature-phase response; and
detect a defect of the sensor electrode based on the in-phase response and the quadrature-phase response.

18. The input device of claim 17, further comprising a flexible display panel that incorporates the sensor array.

19. The input device of claim 17, wherein the processing system comprises:
an AFE configured to generate a first current output based on the first resulting signal;
an ADC configured to apply a first analog-to-digital conversion to the first current output to generate a first digitized output comprising:
a first value corresponding to the in-phase response; and
a second value corresponding to the quadrature-phase response.

20. The input device of claim 19, wherein the processing system is further configured to acquire a second resulting signal from the sensor electrode in a capacitive proximity sensing operation,
wherein the AFE is further configured to generate a second current output based on the second resulting signal in the capacitive proximity sensing operation,
wherein the ADC is configured to apply a second analog-to-digital conversion to the second current output to generate a second digitized output in the capacitive proximity sensing operation, and
wherein the processing system is further configured to generate positional information of an input object based on the second digitized output in the capacitive proximity sensing operation.

* * * * *